(12) United States Patent
Islam et al.

(10) Patent No.: US 6,445,848 B1
(45) Date of Patent: Sep. 3, 2002

(54) SOLITON PULSE TRANSMISSION OVER LONG WAVEGUIDE FIBER LENGTHS

(75) Inventors: Mohammed N. Islam; George A. Nowak; Tiejun Xia, all of Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/674,419

(22) PCT Filed: May 5, 1999

(86) PCT No.: PCT/US99/09776
§ 371 (c)(1),
(2), (4) Date: Oct. 31, 2000

(87) PCT Pub. No.: WO99/59025
PCT Pub. Date: Nov. 18, 1999

Related U.S. Application Data (60) Provisional application No. 60/084,822, filed on May 8, 1998.

(51) Int. Cl.[7] ................................................. G02B 6/28
(52) U.S. Cl. .......................... 385/24; 385/15; 359/326
(58) Field of Search ........................... 359/326; 385/24, 385/15

(56) References Cited

U.S. PATENT DOCUMENTS

| | | | | |
|---|---|---|---|---|
| 5,523,874 A | * | 6/1996 | Epworth | 359/161 |
| 5,737,110 A | | 4/1998 | Suzuki et al. | 359/161 |
| 5,757,529 A | | 5/1998 | Desurvire et al. | 359/179 |
| 5,760,948 A | | 6/1998 | Bigo | 359/326 |
| 5,828,682 A | | 10/1998 | Moores | 372/26 |
| 5,857,040 A | | 1/1999 | Bigo et al. | 385/15 |

* cited by examiner

Primary Examiner—Hung N. Ngo
(74) Attorney, Agent, or Firm—William J. Chervenak

(57) ABSTRACT

Disclosed is an optical circuit for filtering and frequency modulation of soliton signal pulses traveling over long spans of waveguide fiber. The circuit makes use of the filtering properties of a non-linear optical loop mirror (NOLM). The time difference between control pulses and signal pulses co-propagating in the NOLM is controlled to increase or decrease the centroid shift of the signal pulses. The signal and control pulse streams are derived from a single stream of soliton pulses. The NOLM serves to filter low power noise from the soliton signal pulses at the same time as it shifts the centroid frequency of the soliton signal pulses up or down. The circuit can be inserted at advantageous points along a waveguide fiber transmission line to allow propagation of solitons, without electronic regeneration, over line lengths of 100 km.

26 Claims, 7 Drawing Sheets

256
SOLITON PULSE TRANSMISSION OVER LONG WAVEGUIDE FIBER LENGTHS

This application is based upon the provisional application Ser. No. 60/084,822, filed May 8, 1998, which we claim as the priority date of this application.

This invention was made with government support under DARPA contract number F-30602-97-1-2020.

BACKGROUND OF THE INVENTION

The invention is directed to a circuit for recovering the shape and spectrum of an optical signal after the signal has traversed a length of optical waveguide fiber. In particular, the circuit is used to preserve the shape of solitons over long lengths of waveguide fiber without use of electronic regeneration.

The value of soliton transmission of information over optical waveguide fibers is recognized in the art. The possibility of essentially dispersion-free transmission of pulses over long fiber lengths without electronic regeneration has encouraged work in the area of maintaining soliton signal integrity in extended transmission lines. With the introduction of waveguide fibers having attenuation in the range of a few tenths of a decibel per kilometer and optical amplifiers, solitons have become even more attractive as the transmission method of choice in very high bit rate systems or those that make use of wavelength division multiplexing.

A problem to be addressed in using soliton signals is how to control changes in the soliton time window, often called timing jitter, to avoid overlap with neighboring pulses. In addition, one should provide for filtering of noise that arises from the energy shedding of the soliton pulse as it undergoes shape changes during propagation along the fiber. Noise also originates in amplified spontaneous emission in the optical amplifiers At bit rates >50 Gb/sec, the soliton pulse width must be less than about 5 ps to avoid overlap between adjacent soliton time windows. This pulse width is in general sufficient to minimize errors at the receiver end of the transmission. At the same time, the soliton period for these short pulse widths must be kept short relative to the preferred optical amplifier spacing, about 25 km. Thus there is a need to remove the energy lost by the soliton so that signal to noise ratios are at a desired level, inter-symbol interference is eliminated, and optical amplifiers do not become saturated by presence of noise signals.

Another consideration is the self-frequency shift of a narrow time width soliton due to differential Raman amplification of the pulse wavelength spectrum. This shift should be compensated in order to maintain the soliton wavelength within the desired low attenuation operating window and within the gain spectrum of the optical amplifiers.

The control of soliton timing jitter using a non-linear optical loop mirror (NOLM) is described in U.S. Pat. No. 5,757,529, Desurvire et al ('529). In the '529 patent, a loop mirror is used as a switch that rejects system noise by preferential switching of the soliton signal through the NOLM. The switching is brought about my means of a stream of control pulses introduced into the NOLM. The overlap of the signal pulses and the control pulses in time determines the switching characteristics of the NOLM. Because relative timing difference between the signal pulse and control pulse are critical, the '529 patent proposes a clock extraction or recovery circuit that produces a clock signal from the signal solitons. Such clock recovery circuits add considerable cost and complication to an optical circuit employing a NOLM. In some clock circuits, electo-optical devices are employed.

Thus, there is a need for a relatively simple and low cost means for recovering the shape of soliton signal after it has traversed a span of about 25 km of waveguide fiber. Also there is a need to address the problem of selffrequency shifting of the soliton signals without resort to elaborate, expensive optical or electo-optical circuits. The invention disclosed and described in this application incorporates simplicity and low cost into an optical circuit including a NOLM that simultaneously removes transmission circuit noise and recovers the original spectrum of the soliton signals.

SUMMARY

The present invention is an optical circuit for noise filtering and frequency modulation of soliton pulses. The circuit includes a NOLM having its ends optically joined to the output ports of an NXN or first coupler, where N is at least two. Signal pulses are optically coupled to one of the input ports of the coupler and the signal pulses are thus divided into a clockwise (CW) and a counter-clockwise (CCW) stream of pulses propagating in the NOLM. A tap coupler is optically coupled to a point along the length of the NOLM. A stream of control pulses are input into the tap coupler which then couples the control pulses to the NOLM. Both the signal pulses and the control pulses can originate from a single optical soliton source. A source optically couples a stream of solitons to the input port of a splitting coupler which divides the stream of solitons into a stream of control pulses and a stream of signal pulses. Depending upon the direction along the loop mirror in which the tap coupler couples the control pulses, the control pulses will co-propagate with either the CW or CCW propagating signal pulses. The optical circuit is symmetric in the sense that the circuit may be configured to cause interaction between the control pulses and either the CW or CCW propagating signal pulses. It will therefore be understood that the description of the circuit given herein applies equally to the interaction of CW or CCW propagating signal pulses and the control pulses.

The optical path between the splitting coupler and the tap coupler is an optical fiber optically connected between the two couplers. So too, the optical path between the splitting coupler and the input of the first coupler is an optical fiber. The amount of interaction between the control pulses and the signal pulses depends upon the amount of overlap of the two sets of pulses as they travel through the optical loop mirror. This amount of overlap is controlled by selecting the lengths other two fibers that connect the respective pairs of coupler ports to provide a pre-selected lead or lag time of the signal pulses relative to the control pulses.

The interaction of control pulses with co-propagating signal pulses produces both a shift in centroid wavelength and phase (relative to the counterpropagating signal pulses) of the signal pulses. The centroid wavelength may be shifted up or down depending upon whether the control pulses lead or lag the co-propagating signal pulses. The amount of phase shift of the co-propagating signal pulse depends upon the magnitude of the lead or lag time between the control and signal pulses.

The selection of the lengths of the connecting waveguide fibers thus allows one to select the amount of centroid and phase shift of the co-propagating signal pulses in the NOLM.

In addition, the NOLM reflects the stray energy waveforms (noise), due to power shedding of the solitons or due to amplified spontaneous emission. Because the amplitude of the stray pulses is below the level at which nonlinear phase shifting occurs, no phase shift occurs between the CW and CCW propagating noise so they are not switched through the first coupler.

Thus the optical circuit disclosed and described herein serves to shift the centroid wavelength of the co-propagating signal pulses, shift the phase of the co-propagating signal pulse to switch the signal pulses thought the first coupler, and also to remove the low amplitude noise accumulated in the optical circuit. The shift in centroid can be chosen to offset any centroid shift of the solitons caused by differential Raman gain across the soliton spectrum. These functions are accomplished without use of clock extraction circuits or synchronized control pulses from a source separate from the signal soliton source.

In one embodiment of the optical circuit, the lead or lag time of the control pulses relative to the co-propagating signal pulses is within the range of about three times $_T$. Here $_T$ is the soliton pulse width expressed as a time interval between the half maximum power points of the soliton.

An embodiment of the invention includes polarization adjusting components in one or both of the waveguides joined to the tap and first coupler. The control pulse is given a pre-selected polarization relative to the polarization of the signal pulse so that the control pulse may interact with the signal pulse and then be conveniently removed from the loop mirror fiber using a polarization selective coupler. The relative polarization of the respective control and signal pulses is such that the interaction between control pulses and the co-propagating signal pulses is effective to produce the desired phase shift and centroid shift of the signal pulses. Design alternatives that fall within the scope of this invention include relative polarization of control as compared to signal pulses that ranges from orthogonal to parallel. In those cases where the control and signal pulse axes are parallel or nearly so, other means of filtering the control pulse from the NOLM are available. Such means include gratings and wavelength or amplitude discriminators.

In an alternative embodiment, the tap coupler is polarization selective, to provide polarized control pulses in the optical loop mirror. After interaction with the co-propagating signal pulses, the control pulses may then be coupled out of the optical loop mirror by means of a second polarization selective tap coupler located farther along the optical loop mirror in the direction of travel of the control pulses.

In yet another embodiment of the invention, a band pass filter is inserted in the optical path, e.g., an optical fiber, of the signal pulses that have passed through the optical loop mirror. An advantageous feature of this configuration is that the center wavelength of the band pass filter can chosen to coincide with the centroid of the signal pulses exiting the NOLM. Because the NOLM as used herein shifts the centroid, a circuit can be designed which passes the centroid shifted solitons while rejecting noise near the wavelength of the original soliton. Thus the signal pulses pass through the band pass filter with minimum loss of power while noise pulses at the wavelength of the control pulses or original signal pulses are reflected or absorbed. This is an alternative use of the optical circuit as compared to use described above where the optical circuit including a NOLM is used to cancel self frequency shifting of the soliton due to differential Raman gain. Signal pulse centroid shifts in the range of +/−2 nm are possible so that the offset of the center wavelength of the band pass filter is effective to filter soliton pulses or noise at the wavelength of the source solitons.

In yet a further embodiment, an optical amplifier can be optically incorporated into the fiber that carries the signal pulses switched through the optical loop mirror. This amplifier serves to offset losses in the loop mirror and in the band pass filters. The amplifiers can be, for example, lumped or distributed erbium doped optical amplifiers. Also semiconductor optical amplifiers may be used.

The length of the waveguide fiber of the optical loop mirror itself is selected to be effective to allow a desired interaction length between the control and signal pulses. A non-linear optical loop mirror length thus is in the range of about 200 m to 2 km. For signal pulses in the wavelength range around 1550 nm, a dispersion shifted fiber, a fiber having a dispersion zero in the range of about 1400 nm to 1600 nm, is used in the NOLM. Longer and shorter optical loop mirror lengths have been used by those skilled in the art. These longer or shorter lengths could be incorporated into the optical loop mirror of the present invention.

In a further embodiment of the invention, the second waveguide fiber (or the first waveguide fiber) can include a variable time delay component so that the relative lag or lead time between signal and control pulses may be adjusted.

Additional embodiments of the invention include those that have different ratios of coupling to the output ports. For example, the first coupler can divide the power equally between the CW and CCW pulses propagating in the optical loop mirror. Advantageous configurations include those having the coupling ratios of the first coupler in the range of about 30%::70% to 70%::30%. Likewise the power ratios of the splitting coupler outputs can be varied between about 10%::90% to 90%::10%.

In a particular embodiment of the invention, the splitting coupler provides about 10% of the input soliton power to the tap coupler. This configuration provides-for higher power signal pulses exiting the optical loop mirror. An optical amplifier can be added into the second fiber, which optically joins the splitting coupler to the tap coupler, to maintain the control pulse amplitude at a a level sufficient to provide for non-linear cross phase modulation of the co-propagating signal pulse by the control pulse.

The optical amplifier in this second connecting fiber can be a lumped or distributed fiber amplifier or a semiconductor optical amplifier. In this latter case, the semiconductor optical amplifier can be selected to shift the wavelength of the control pulses. The tap couplers that respectively couple the control pulses into and out of the loop mirror can then be chosen to be wavelength selective. This is yet another alternative to the use of polarization selective tap couplers.

The optical circuit described above can be used in long transmission links designed for soliton signals. Thus an additional aspect of the invention is an optical waveguide transmission circuit that incorporates one or more of the optical circuits including a NOLM described above. The incorporation of one or more of these optical circuits into a transmission circuit serves to maintain the desired shape and signal to noise ratio of the signal solitons without recourse to electronic regeneration of the signal.

In an embodiment of the optical waveguide transmission circuit, an optical loop mirror circuit is inserted after the solitons have traversed between 25 km to 50 km of waveguide fiber. Signals exiting this first optical circuit can traverse about 50 km to 75 km of the transmission circuit before another optical loop mirror is needed to again reshape the soliton signal pulses.

In a further embodiment of the optical waveguide transmission circuit, a number of optical amplifiers or band pass filters may be optically incorporated into the extended fiber lengths before or after the optical loop mirror circuits.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
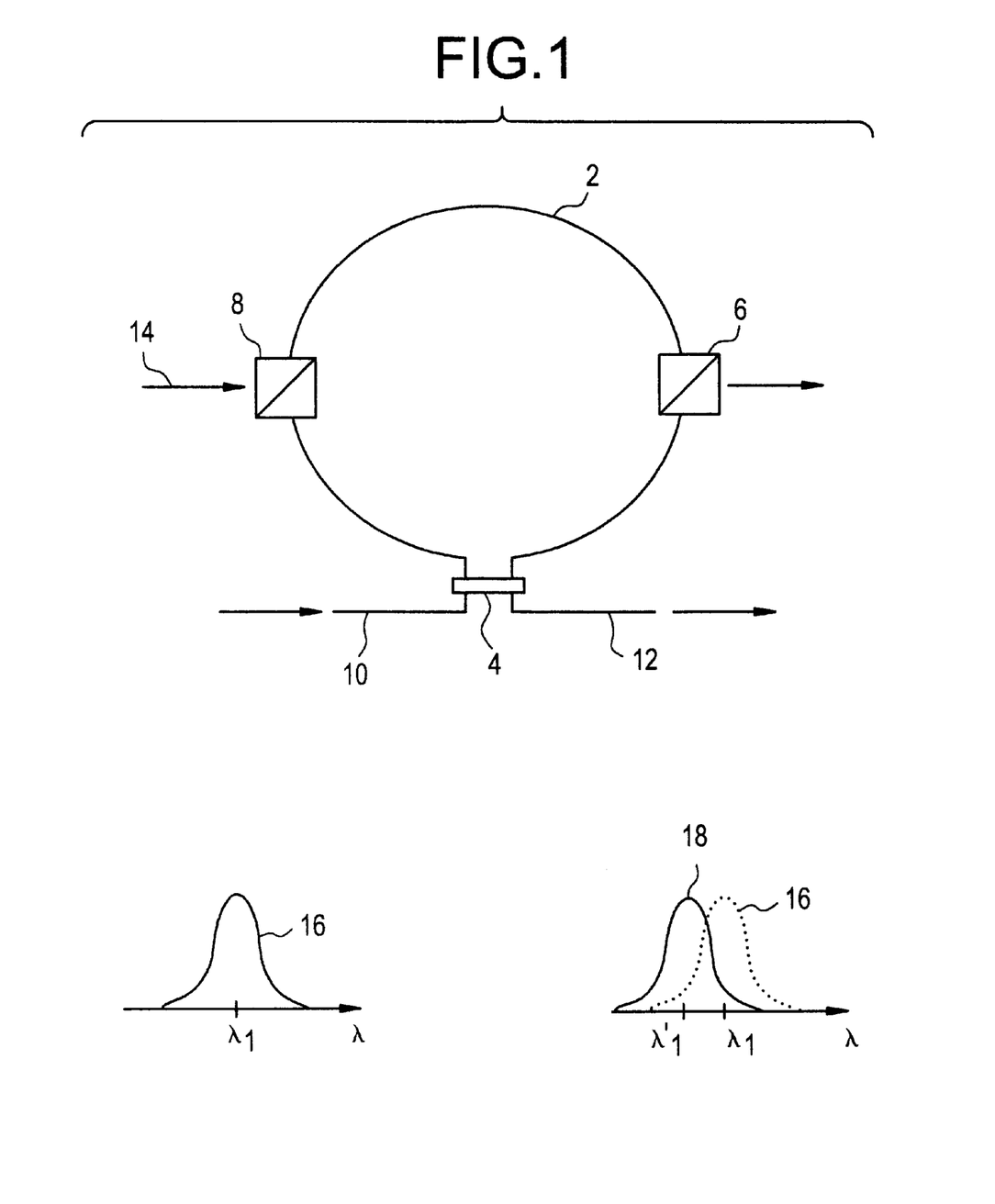
FIG. 1 is a schematic drawing of a non-linear optical loop mirror (NOLM).

A basic schematic drawing of the optical circuit including a NOLM is shown in FIG. 1. The ends of non-linear fiber loop 2 are optically joined to coupler 4. Via fiber 10, the signal pulses arrive at coupler 4 and are coupled into the loop 2 of the loop mirror as a clockwise (CW) and a counter-clockwise (CCW) stream of pulses propagating in loop 2. Control pulses are coupled into the loop 2 through coupler 8, which in this embodiment incorporates any of the alternative selective methods described above including polarization, amplitude or wavelength selective coupler so that the control pulses propagating in loop 2 have a particular property that distinguishes them from the signal pulses. The distinction is sufficient to allow the control pulses to be selectively coupled out of the loop mirror. Yet the distinction between control and signal pulses is not so great as to preclude the desired interaction of the signal and control pulses. For the case shown in FIG. 1, the control pulses interact with the CW propagating signal pulses. The time delay between the signal and control pulses is selected to produce the desired phase and centroid shifts of the signal pulses. The input signal pulse is illustrated by curve 16 in FIG. 1. A comparison of the input signal pulse 16 with the output signal pulse 18 illustrates the case in which the control pulse lags the signal pulse and so decreases the centroid wavelength. Thus pulse 18 has centroid wavelength $\lambda_1'$ which is less than $\lambda_1$, the centroid wavelength of the input signal pulse 16. The term centroid is used here to describe the first moment of an amplitude versus wavelength chart representative of the pulse. The use of this definition is preferred over defining the pulse by means of its peak amplitude wavelength. The centroid definition takes into account non-uniformity in the pulse shape.

The interaction of control pulses with the CW signal pulses, through the non-linear effect, cross phase modulation, serves to change the phase of the CW pulses relative to CCW pulses, so that the CW and CCW have at least a partial phase match at coupler 4. Constructive interference thus occurs at coupler 4 and the signal pulses are switched out of the NOLM into fiber 12. Without the phase change induced in the signal pulses by the control pulses only destructive interference would occur at coupler 4 and no switching would occur. Although a 180° phase shift of the CW as compared to the CCW pulses provides for maximum signal pulse power switching, switching of a portion of the power will still occur at coupler 4. The remaining control pulse power is coupled out of loop 2 by coupler 6 to prevent unwanted interaction of control pulses with CW and CCW signal pulses at coupler 4. Coupler 6 may be chosen to be polarization, amplitude, or wavelength sensitive.

The switching and centroid shifting function of the NOLM can be described as follows. An attractive force is present between solitons close to one another in an optical path. This attractive force shifts the spectral power distribution of the control and signal pulses, thereby shifting their respective centroids. If the control pulse leads the signal pulse, the centroid (center wavelength as defined above) of the signal soliton will be increased. Conversely, a lagging control pulse will decrease the centroid wavelength of the signal pulse. The amount of increase or decrease of signal pulse centroid depends upon the magnitude of the difference in travel time of the signal and control pulses. The spectral redistribution of signal pulse power is manifested as a phase shift of the CW signal pulses relative to the CCW signal pulses. Although this simplified explanation is useful in understanding the invention, the correctness of this explanation in no manner affects the scope of the invention as claimed.

In addition to the switching and phase shifting functions, the NOLM also serves to reflect the noise that may be traveling with the signal pulses. In coupler 4, the noise is split into CW and CCW propagating portions. Because the noise is typically below the amplitude threshold of nonlinear phase shifting in the loop fiber 2, the CW and CCW arrive back at coupler 4 with no relative phase shift and thus are not switched to output fiber 12.

Figure 2:
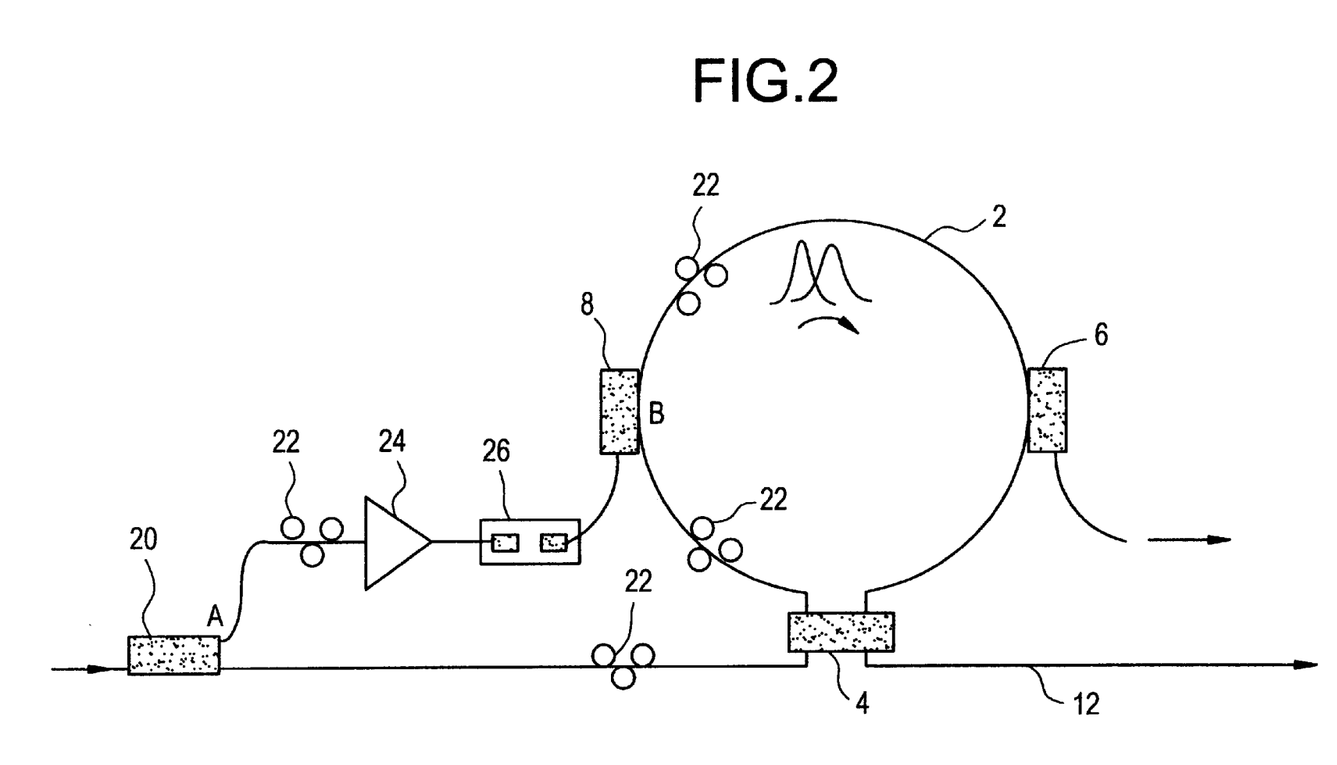
FIG. 2 is a schematic drawing of an optical circuit including a NOLM.

The optical circuit including a NOLM is shown schematically in FIG. 2. A soliton source (not shown) supplies a pulse stream to splitting couple 20, which divides the pulse stream into control and signal pulse streams. Polarization adjusting devices 22 (for example, a combination of quarter wave plate and a half wave plate or a combination of a quarter, a half, and another quarter wave plate) are placed in the respective control pulse paths and signal pulse paths. The polarization adjusting devices 22 in the fiber loop 2 are used to maximize efficiency of control and signal pulse interaction in the case in which the pulse polarization of control and signal pulses is parallel. In the case of orthogonally polarized pulses, devices 22 blocks leakage of light energy having other than orthogonal polarization. These polarization adjusting devices are tuned to provide for maximum signal power switching out of the NOLM. An optical amplifier 24 is optically joined in the control pulse waveguide fiber path to ensure that the amplitude of the control pulse is in the non-linear regime of loop fiber 2. The use of amplifier 24 is preferred because it allows one to choose a splitter coupler 20 which diverts a larger amount of the source power to the signal pulse. The overlap of signal and control pulses is set by the relative travel time of the respective control and signal pulses from point A, at the output of coupler 20, to point B on loop 2 where the control pulse is coupled into loop 2. The overlap may be set by adjusting the lengths of waveguide fibers that optically join the components in the respective signal and control pulse paths. By means of this relatively simple optical circuit, the signal is selectively switched through the NOLM, the stray noise energy from power shedding of the solitons or spontaneous emission in the amplifier is reflected, and the centroid is shifted by a pre-selected amount.

The amplifier 24 may be a lumped or distributed fiber amplifier or a semiconductor optical amplifier. As discussed above, the semiconductor optical amplifier can advantageously be used to shift the wavelength of the control pulses so that a wavelength selective second tap coupler may be used to remove the control signal from the loop. The use of a wavelength discriminating tap couple allows one to adjust the polarization of the control pulses to be parallel or nearly parallel to that of the signal pulses.

The optical circuit of FIG. 2 is afforded greater flexibility by introducing variable time delay component 26 into the optical path of the control signal. Optical time delay components are known in the art and will not be discussed here. By means of variable delay 26, the lag or lead of the control pulse can be adjusted, which in turn adjusted the amount of overlap of the signal and control pulses in loop 2. Thus, the amount of centroid shift and phase shift of the signal pulse can be adjusted. For example, one may adjust the variable delay (or the fiber path length) to cancel self frequency shifting due to Raman differential amplification.

Figure 3:
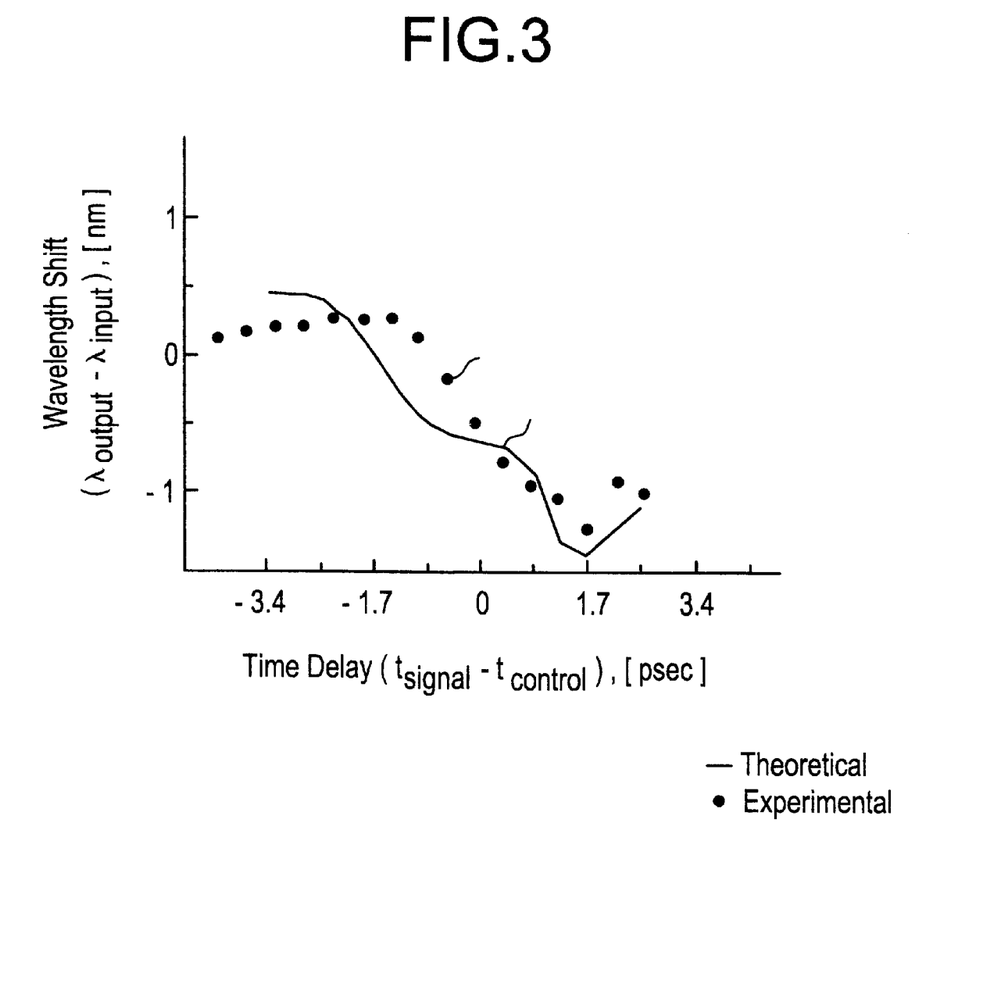
FIG. 3 is a chart showing exemplary wavelength shift of a signal pulse vs. the time delay of the control pulse.

Dotted curve 28 of FIG. 3 shows the experimental signal pulse centroid shift as delay is changed. Solid line 29 is a theoretical curve derived from a model which assumes a background birefringence of $5 \times 10^{-7}$. At a delay of zero, i.e., the signal and control pulses completely overlap, there is no centroid movement. Maximum signal pulse centroid movement is achieved near time delays of about +/−1.7 ps. The amount of centroid shift is in the range of about +/−2 nm, which will allow a signal so shifted to be filtered by means of a narrow band pass device.

EXAMPLE 1

Figure 4:
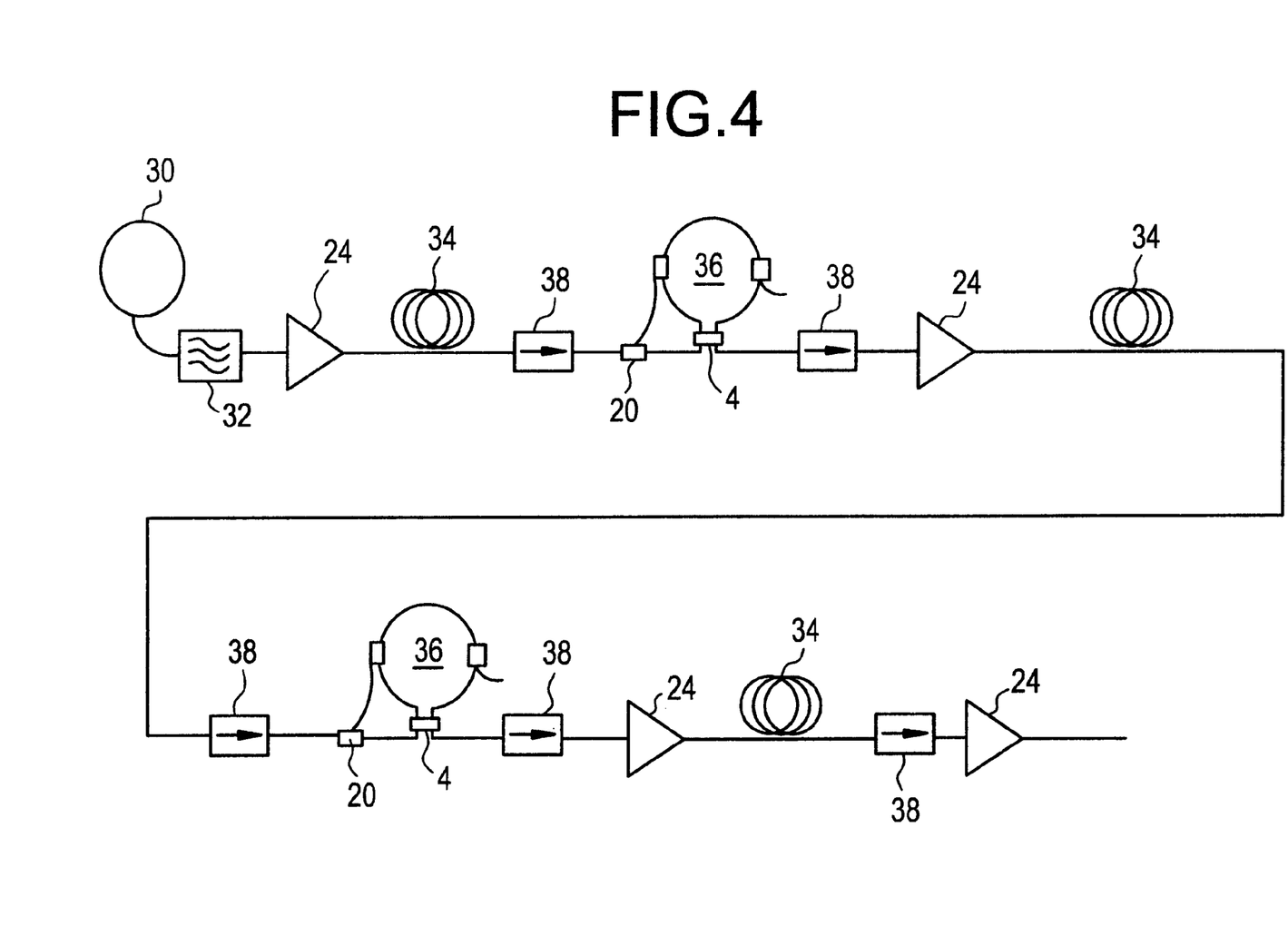
FIG. 4 is a schematic drawing of an optical waveguide transmission circuit using two optical circuits each including a NOLM.

An optical transmission circuit was assembled in accord with FIG. 4. Ring laser 30 produced narrow pulses (470 fs) at 1560 nm which were broadened to about 1.5 ps pulses by passing them through a 2 nm gaussian band pass filter 32. The power output after the first optical amplifier 24 of each span was about 275 $\mu$W, corresponding to solitons of order N=1.1. The pulses then passed through 25 km of step index fiber 34 and optical isolator 38. The splitting coupler 20 divided the input power at a 75::25 ratio of control pulse power to signal pulse power, respectively. The coupler 4 divided the signal power equally between CW and CCW pulse streams in first NOLM 36 to maximize the reflection of noise signal power in the NOLM. The delay time between signal and control pulses was selected to cancel the soliton self frequency shift picked up in the first 25 km of waveguide fiber. The signal was transmitted through another isolator 38, optical amplifier 24, 25 km of fiber 34, an additional isolator 38 and into the second NOLM 36. The couplers of the second NOLM were configured as for the first NOLM. The signal pulse was switched through the second NOLM and, as described above, passed through an optical amplifier, 25 km of fiber and a pair of isolators. The signal was then amplified a final time by fourth optical amplifier 24 and sent to a receiver for detection and measurement.

Figure 5:
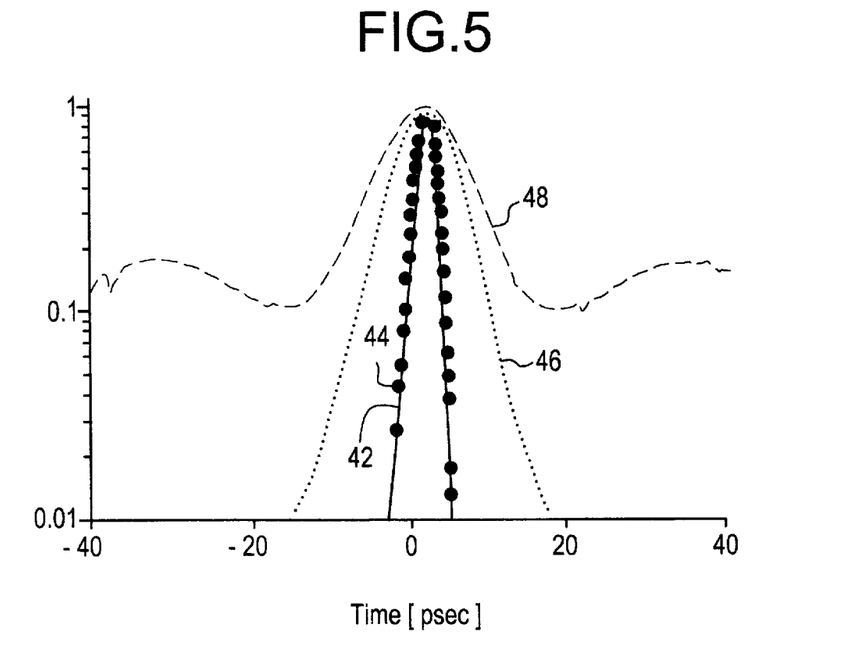
FIG. 5 is an auto-correlation chart of an input signal pulse compared to an output signal pulse that has traveled through an optical transmission circuit including 75 km of fiber and two optical circuits each having a NOLM.
Figure 6:
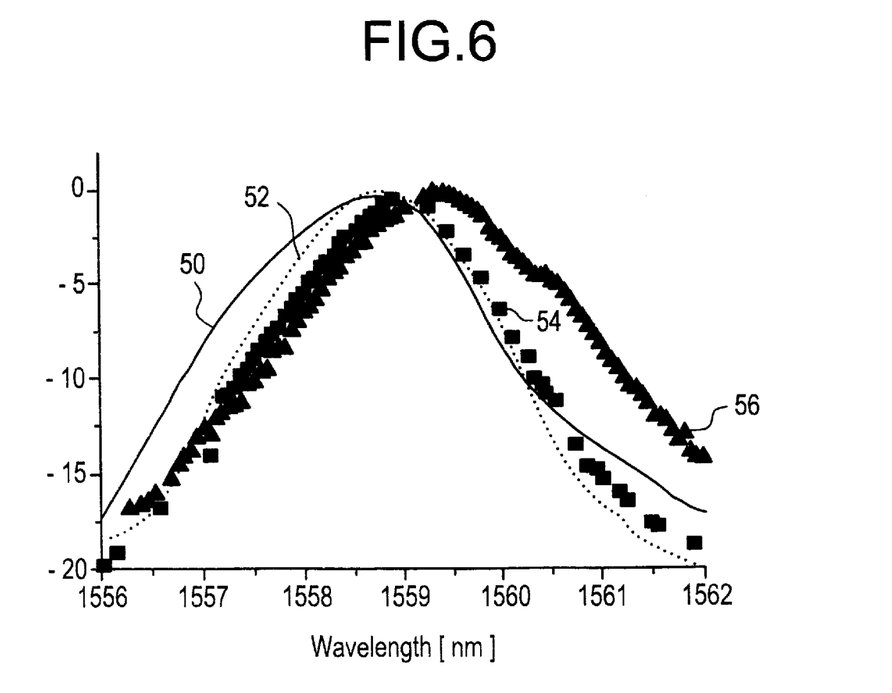
FIG. 6 is a chart of the soliton pulse intensity vs. wavelength for an input signal pulse compared to output signal pulse that has traveled through an optical transmission circuit including 75 km of fiber and two optical circuits each having a NOLM.

The results of the measurements are shown in FIGS. 5 and 6. The auto-correlation function in FIG. 5 shows a comparison of the input pulse, detected after first filter 32 in FIG. 4, curve 42 as compared to the signal pulse exiting the second NOLM, curve 44. The soliton shape was essentially completely recovered by the optical circuits including a NOLM. Curve 46 is the signal pulse measured after its transit through the full 75 km of the transmission circuit. Pulse 46 shows essentially no noise signal and about a threefold broadening of the pulse. In contrast, curve 48 shows the pulse detected after the signal had traversed the entire 75 km transmission circuit, but with the two optical circuits including a NOLM removed. The noise floor of curve 48 is raise by more than a factor of ten and the width is quite broad compared to input pulse 42 or 75 km pulse 46. The chart shows the marked improvement in pulse shape provided by the optical circuit including a NOLM.

The chart of pulse spectrum in FIG. 6, also shows the efficiency of the NOLM in canceling soliton self frequency shifting. The input pulse is shown as curve 50. The signal pulse spectrum detected after the signal pulse had exited the first NOLM 36 is shown as curve 52. The spectral shift is very small. Likewise, curve 54 shows the signal spectrum after the signal pulse has traversed the full 75 km transmission circuit of FIG. 4. The centroids of respective curves 50, 52, and 54 are seen to be nearly identical. Curve 56 shows the signal pulse spectrum for a signal which has been transmitted through the full 75 km transmission circuit with the optical circuits, each including a NOLM, removed. The centroid of the spectrum is shifted by several nm and the spectrum shape has been markedly altered.

EXAMPLE 2

Figure 7:
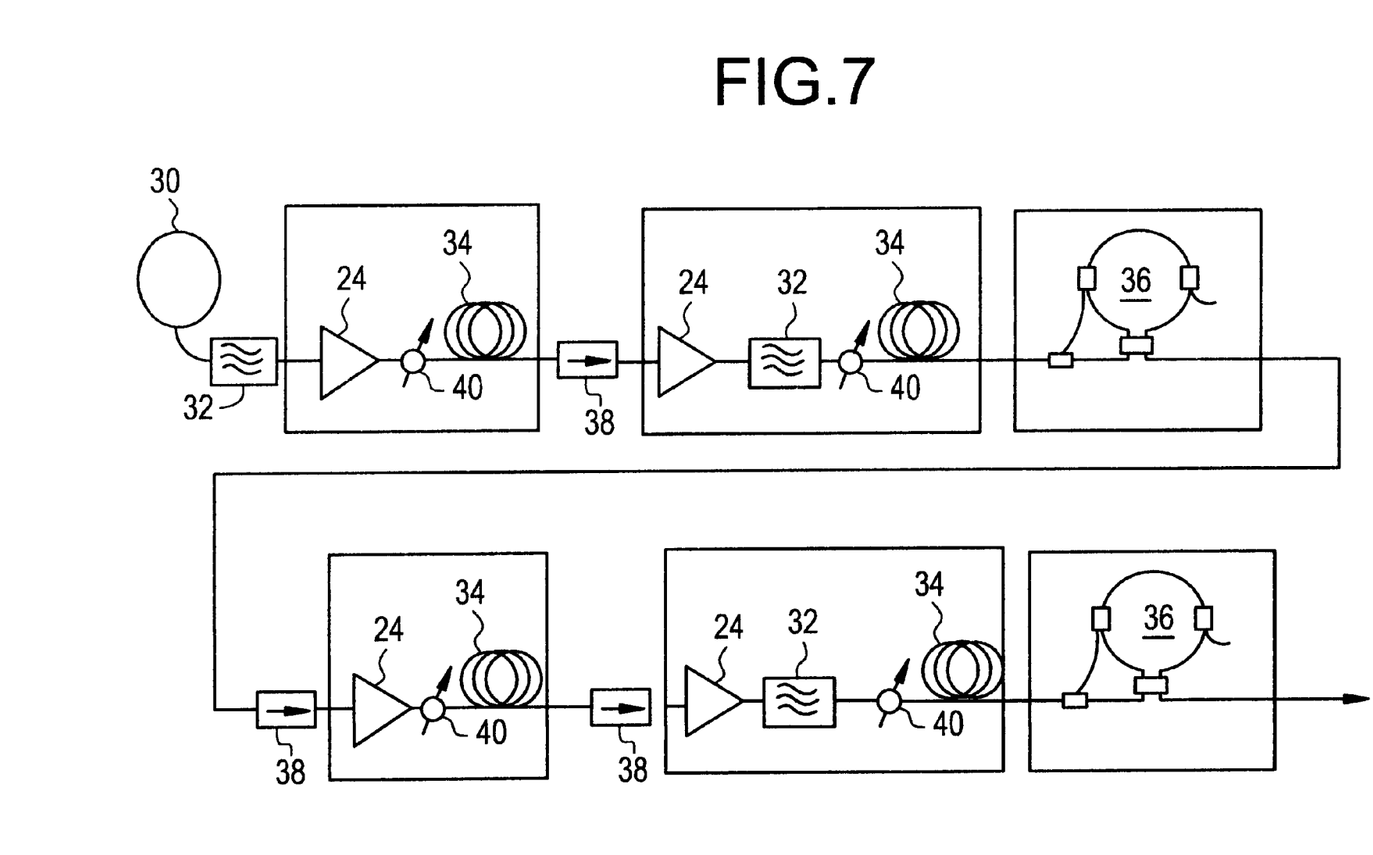
FIG. 7 is a schematic drawing of an optical waveguide transmission circuit using two optical circuits each including a NOLM.

A second optical transmission circuit was assembled as shown schematically in FIG. 7. The circuit differs from that of FIG. 4 in that the first optical circuit including a NOLM 36 was placed after the signal had been transmitted through 50 km of single mode waveguide fiber. The output signal from the first NOLM 36 was then transmitted through an additional 50 km of single mode fiber before the signal was again conditioned by and switched through an optical circuit including a NOLM located at the end of the 100 km transmission circuit. Variable attenuators 40 were introduced into the circuit after each amplifier to adjust the soliton amplitude to the desired value.

Figure 8:
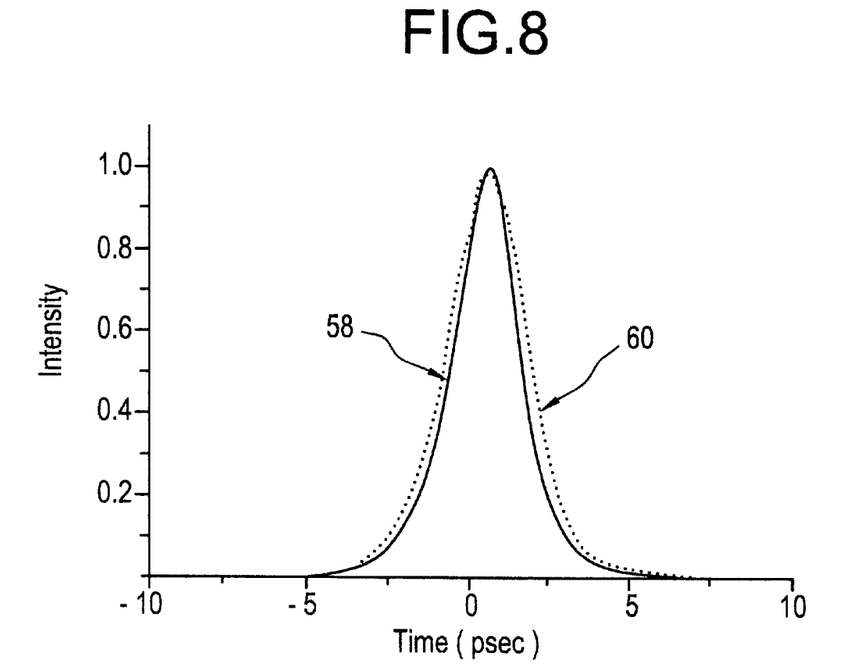
FIG. 8 is an auto-correlation chart of an input signal pulse compared to output signal pulses that have traveled through 100 km lengths of a transmission circuit having and not having one or more optical circuits each including a NOLM.

The chart of the auto-correlation shows that the optical circuits each including a NOLM served to almost completely recover the shape and width of the input signal pulse. In FIG. 8, compare the input pulse 58 to the output pulse 60 which was transmitted through 100 km of single mode fiber.

Figure 9:
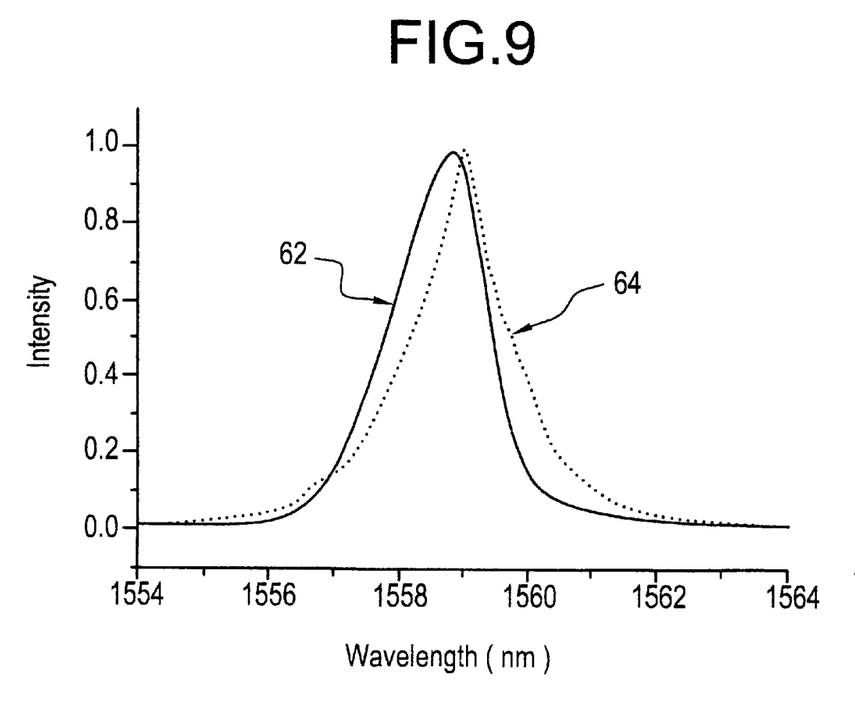
FIG. 9 is a chart of the soliton pulse intensity vs. wavelength for an input signal pulse compared to output signal pulses that have traveled through 100 km lengths of a transmission circuit having and not having one or more optical circuits each including a NOLM.

The intensity versus wavelength chart of FIG. 9 shows that the spectrum of the input pulse 62 has also been almost completely recovered in output pulse spectrum 64.

Thus the optical circuit including a NOLM provides, improvement of signal to noise ratio, a shift of soliton centroid wavelength to compensate self frequency shift, and recovery of the soliton pulse width. The circuit is relatively simple yet still provides for picosecond soliton transmission over 100 km transmission links.

It will be apparent to those skilled in the art that various modifications and variations of the present invention can be made without departing from the spirit and scope of the invention. Thus, it is intended that the present invention include the modifications and variations of this invention provided they come within the scope of the appended claims and their equivalents.

We claim:

1. An optical circuit for filtering and frequency modulation of solitons propagating in the circuit comprising:
    a non-linear-optical-loop mirror having ends and a length;
    a first coupler having at least two input ports and two output ports, wherein the ends of the optical loop mirror are each optically joined to a respective output port of the first coupler;
    a tap coupler having at least one input port and an output port optically coupled to a point along the optical loop mirror length;
    a splitting coupler having at least one input port and two output ports, a first splitting coupler output port optically joined to a first input port of the first coupler by a first optical fiber and a second splitting coupler output port joined to the input of the tap coupler by a second optical fiber;
    wherein, the respective lengths of the first and second optical fibers are chosen to provide a pre-selected difference in travel time of solitons in the circuit between the respective splitter coupler output ports and said point along the optical loop mirror at which the tap coupler is optically coupled to the optical loop mirror; and,
    wherein the difference in travel time is small enough to provide for overlap in the optical loop mirror of the solitons coupled into the optical loop mirror from the output port of the tap coupler and the solitons, which co-propagate with the solitons coupled by the tap coupler, coupled into the optical loop mirror from the first input port of the first coupler.

2. The circuit of claim 1 wherein the difference in travel time between the co-propagating solitons is no greater than about three times $\tau$, wherein $\tau$ is the soliton pulse width expressed as a time interval between the half maximum power points of the soliton.

3. The circuit of claim 1 wherein the tap coupler is a first polarization selective tap coupler that couples solitons of a particular polarization into the optical loop mirror.

4. The apparatus of claim 3 further comprising a second polarization selective tap coupler, optically coupled to the optical loop mirror to remove polarized solitons coupled into the loop mirror by the first polarization selective tap coupler, wherein the coupling point of the second polarization selective tap coupler with the optical loop mirror is farther along the length of the optical loop mirror, relative to the coupling point of the first polarization selective tap coupler, in the direction of propagation of the coupled polarized solitons.

5. The circuit of claim 4 further comprising two polarization adjusting components optically incorporated into the respective first and second waveguide fibers, wherein soliton pulses passing through the respective polarization adjusting components have polarization axes that form a pre-selected included angle therebetween.

6. The circuit of claim 5 wherein the included angle is 90°.

7. The circuit of claim 5 wherein the included angle is zero.

8. The circuit of claim 1 further comprising an optical band pass filter optically joined to the second input port of the first coupler by a third waveguide fiber, wherein the center wavelength of the pass band of the optical filter is offset by a pre-selected amount from the center wavelength of the solitons leaving the splitting coupler.

9. The circuit of claim 8 wherein the pre-selected offset of the center wavelength of the optical band pass filter is in the range of about +/−2 nm.

10. The circuit of claim 8 further comprising optical amplifying means optically incorporated into the third waveguide fiber.

11. The circuit of claim 10 wherein the optical amplifying means is selected from the group consisting of a lumped erbium doped optical amplifier, a distributed erbium doped optical amplifier, and a semiconductor optical amplifier.

12. The circuit of claim 1 wherein the time difference in travel time between the solitons directed to the input port of the tap coupler and the solitons directed to the first input port of the first coupler output is positive.

13. The circuit of claim 1 wherein the time difference in travel time between the solitons directed to the input port of the tap coupler and the solitons directed to the first input port of the first coupler output is negative.

14. The circuit of either one of claim 12 or 13 wherein the length of waveguide fiber included in the optical loop mirror is in the range of about 200 m to 2 km and the waveguide fiber has zero dispersion wavelength in the range of 1400 nm to 1600 nm.

15. The circuit of any one of claims 1–13 further including a variable time delay component optically incorporated into the first or second waveguide fiber.

16. The circuit of claim 15 wherein the splitter coupler is selected to split the input power of the solitons between the first waveguide fiber and the second waveguide fiber in a ratio range of about 10%::90% to 90%::10%.

17. The circuit of claim 15 wherein the first coupler divides the power of the solitons transmitted to the respective ends of the optical loop mirror in a ratio in the range of about 30%::70% to 70%::30%.

18. The circuit of claim 1 further including an optical amplifier optically incorporated into the second waveguide fiber.

19. The circuit of claim 18 wherein the optical amplifier is selected from the group consisting of a lumped erbium doped optical amplifier, a distributed erbium doped optical amplifier, and a semiconductor optical amplifier.

20. The circuit of claim 19 wherein the optical amplifier is a semiconductor optical amplifier that shifts the wavelength of the solitons entering the tap coupler relative to the wavelength of the solitons entering the first input port of the first coupler, and wherein the circuit further included a second tap coupler, that is wavelength selective, optically coupled to the optical loop mirror to remove wavelength shifted solitons coupled by the first tap coupler, wherein the coupling point of the second tap coupler with the optical loop mirror is farther along the length of the optical loop mirror, relative to the coupling point of the first tap coupler, in the direction of propagation of the coupled wavelength shifted solitons.

21. The circuit of claim 1 further including polarization adjusting devices within the non-linear-optical-loop mirror.

22. An optical waveguide circuit for transmission of soliton pulses comprising:

a first circuit in accordance with any one of claim 1–13 or 18–20 wherein the input port of the splitting coupler is optically coupled to an extended waveguide fiber length that is carrying solitons;

a second circuit in accordance with any one of claim 1–13 or 18–20 wherein the input port of the splitting coupler of the second circuit is optically joined to the second input port of the first coupler of the first circuit by a second extended length of waveguide fiber.

23. The optical waveguide circuit if claim 22 wherein the first extended waveguide fiber length is in the range of about 25 km to 50 km.

24. The optical waveguide circuit of claim 22 wherein the second extended waveguide fiber length is in the range of about 50 km to 75 km.

25. The optical waveguide circuit of claim 23 wherein either the first or second extended waveguide fiber length includes at least one optical amplifier and at least one optical band pass filter.

26. The optical waveguide circuit of claim 24 wherein either the first or second extended waveguide fiber length includes at least one optical amplifier and at least one optical band pass filter.

* * * * *